Aug. 8, 1933.    R. PAWLIKOWSKI    1,921,132
POWDERED FUEL ENGINE AND METHOD OF OPERATING THE SAME
Original Filed Feb. 10, 1928
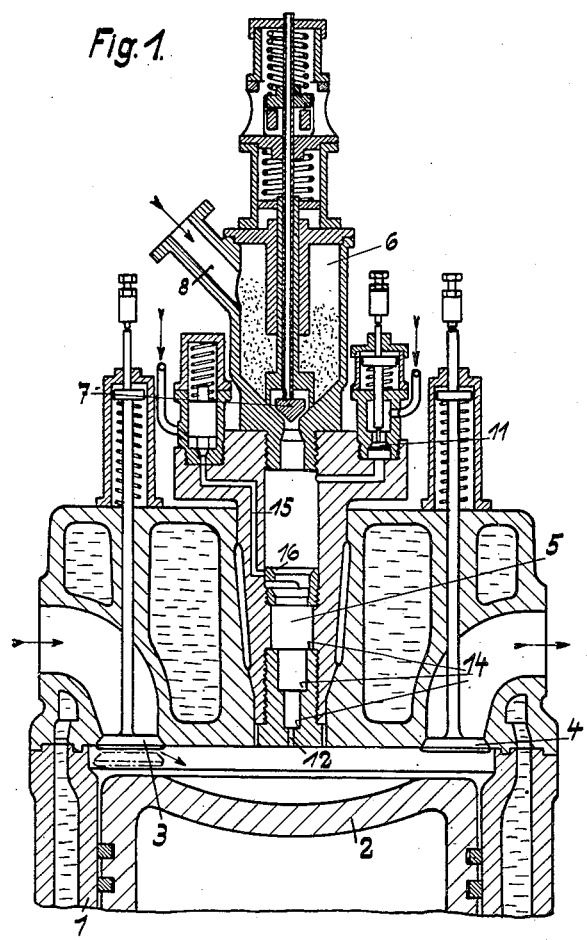
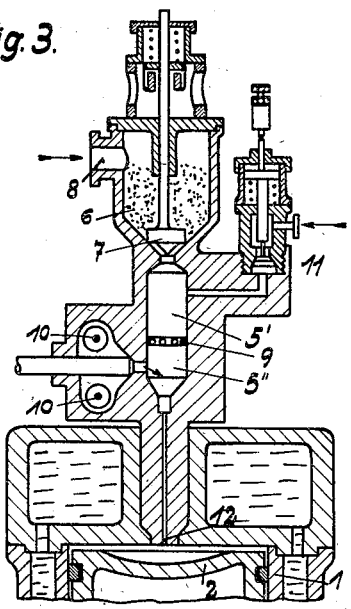
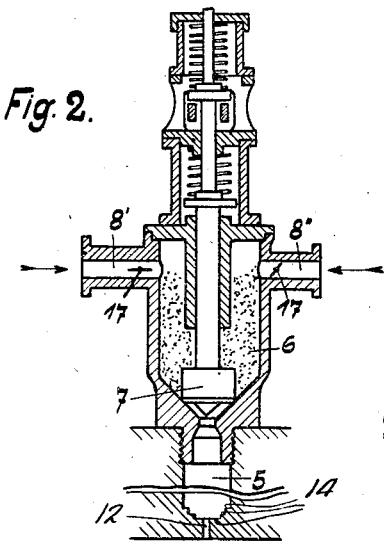
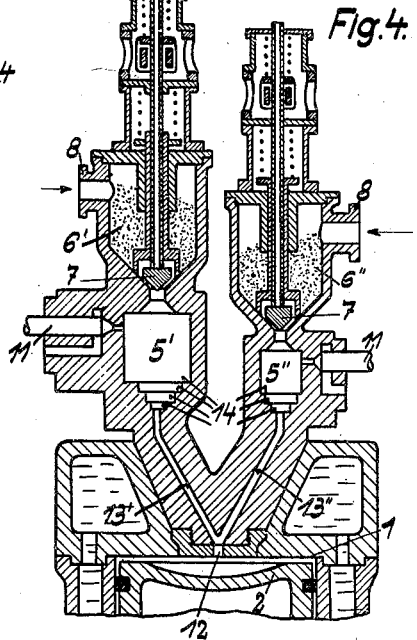

Patented Aug. 8, 1933

1,921,132

UNITED STATES PATENT OFFICE 1,921,132

POWDERED FUEL ENGINE AND METHOD OF OPERATING THE SAME

Rudolf Pawlikowski, Goerlitz, Germany

Original application February 10, 1928, Serial No. 253,510, and in Germany June 14, 1927. Divided and this application September 3, 1929. Serial No. 390,097

11 Claims. (Cl. 123—23)

In powdered fuel engines only such fuels can be used as will ignite and burn up during the short time space of one stroke of the engine. This capacity to burn is small if the grains of powder are large, or if the fuel powder is moist (e. g. peat or wood-meal), high in ash content (e. g. coke from the distillation of coal or lignite) and low in materials volatilizable by heat (e. g. coke or anthracite coal, etc.).

Such fuel powders which ignite with difficulty or burn up too slowly can be adapted for driving internal combustion engines in accordance with my invention by utilizing them together with quick igniting or burning kinds of powder. One may use a ready mixture of slow igniting powders (e. g. coke powder, moist peat dust, coal dust with high ash content or low in volatile gases, etc.), and easily igniting kinds (e. g. lignite powder or dust of naphthalene, anthracene, sugar or the like). On the other hand, one may, instead of using the previously prepared mixture, bring the two kinds of powder having good and poor ignition qualities together as it is introduced into the machine, that is, either in a small reservoir on the machine, in the injection nozzle, or even in the combustion chamber of the engine itself. These various possibilities are illustrated by way of example in the accompanying drawing in powdered fuel engines of the type shown in my U. S. Patent No. 1,656,678 of April 20th, 1923 and my application Serial No. 214,436 of August 20th, 1927.

This application is a division of my co-pending application Serial No. 253,510, filed February 10th, 1928.

Fig. 1 is a vertical section of a portion of an engine taken on the axis of one cylinder and showing the fuel feeding mechanism in section, Fig. 2 is a vertical section of a slightly modified form of fuel reservoir.

Fig. 3 is a view similar to Fig. 1 showing another modification, and

Fig. 4 is a view similar to Fig. 1 showing still another modification.

In Fig. 1 is shown an internal combustion engine having the usual cylinder 1, a piston 2 adapted to reciprocate therein, and the usual inlet and exhaust valves 3 and 4 for the four stroke cycle.

Upon the cylinder 1 and having means of communication therewith is a precombustion chamber 5 into which for every working stroke of the engine a quantity of fuel powder is charged from the reservoir 6 by means of the geared charging valve 7. From the precombustion chamber 5 the charge of fuel is conveyed into the combustion chamber of the cylinder 1 in any desired manner. For example it may be blown into the cylinder 1 by compressed air which is admitted to the precombustion chamber 5 at proper intervals by the valve 11. Instead of this arrangement a partial combustion of the fuel powder in the precombustion chamber 5 may be used to blow the whole contents of the precombustion chamber into the cylinder 1.

The fuel powder reservoir 6 on the cylinder cover is filled with a ready prepared mixture of quick and slow igniting fuel powder through a nipple 8. This powder mixture can be led to the reservoir 6 in any desired manner. It can, for example, be blown in by a blower such as shown in Fig. 1 of my U. S. Patent No. 1,656,678 or it may be driven in by the feeding mechanism shown in Fig. 8 of that patent. The reservoir 6 can, however, also be filled by means of conveyor screws or it may be filled by hand from time to time.

The quick igniting grains of fuel powder catch fire first after they are fed into the precombustion chamber, from the heat of the compressed air. The flame which arises and the heat released by it cause the less quickly igniting grains of powder to catch fire partly in the precombustion chamber 5, but at the latest after their entrance into the working cylinder 1 and to burn up quickly enough.

In the illustrative embodiment shown in Fig. 2 the mixture of quick and slow igniting powder is made in the reservoir 6. In this case the reservoir 6 has two charging nipples 8' and 8", through one of which the quick igniting powder and through the other the slow igniting powder can be fed, the two being mixed in the reservoir 6. The relative quantities of the two kinds of fuel powder can be regulated by the two throttles 17 in the charging nipples 8' and 8". A sufficient mixing of the two kinds of powder can be accomplished by means of stirring devices (not shown) in the reservoir 6. Generally, however, the up and down motion of the charging valves 7 is sufficient to cause a good mixture of the powders. In other respects the engine may be the same as that shown in Fig. 1.

In Fig. 3 the quick and slow igniting powders are first brought together in the precombustion chamber 5. The latter is divided into two spaces 5' and 5" by a built-in member such as the sieve 9. The space 5' receives its charge of slow igniting powder from the reservoir 6. The quick igniting powder is fed into the spaces 5" by suitable means such as screw conveyors 10 of the type shown in Fig. 2 and described in the specification of my Patent No. 1,656,678. Each time the charge in the precombustion chamber 5 is blown out into the combustion chamber of cylinder 1 the quick igniting powder which is located nearest to the jet 12 in the space 5'' is blown first into the cylinder 1 and creates a priming flame which sets fire quickly and surely to the following slow igniting powder from the space 5'. The sieve 9 in the precombustion chamber may be omitted. The two kinds of powder then mix together in the precombustion chamber 5 to form a mixture in which the quick igniting powder causes the slow igniting powder to inflame.

In Fig. 4 two kinds of fuel powder distinguished by different capacities for igniting are led into the working cylinder by separate paths. For this purpose separate precombustion chambers 5' and 5'' for slow igniting and quick igniting powder respectively are interposed between the cylinder 1 and separate reservoirs 6' and 6'' from which the combustion chambers are charged with the two kinds of powder. The communication ducts 13' and 13'' from the precombustion chambers lead to a common inlet opening 12. The precombustion chambers are blown out successively by suitable control of their compressed air valves 11 in such a manner that the quick igniting powder from the combustion chamber 5'' enters the cylinder 1 first. The slow igniting powder coming from the chamber 5' somewhat later encounters, upon entering the cylinder 1, a priming flame produced by the quick igniting powder. Instead of the common inlet opening 12 a separate inlet opening into the cylinder 1 can be provided for each combustion chamber 5' and 5''.

Since the quick igniting kinds of powder are nearly always more costly than the slow igniting kinds it is advantageous in employing my method to use a greater quantity of the slow igniting powder as the primary driving fuel and to add only a small quantity of the quick igniting kind as a primer. The quick igniting powder can be made of different kinds of combustible material from the slow igniting powder, or under certain conditions may consist of the same material as the latter.

In the case of moist fuel or that which is high in ash one need only subject a fraction thereof, which can easily be determined by experiment, to a more complete drying or de-ashing (e. g. by flotation or sifting), or in other words, by purifying it with respect to its ignition properties, in order to obtain a mixture which will operate satisfactorily in an internal combustion engine.

With many fuel powders it is sufficient merely to grind a relatively small part of the fuel powder very fine, leaving the greater part in the form of larger grains so as to reduce the cost of production. The finest powder grains then inflame first during the operation of the machine and sufficiently quickly, because the heat of compression of the combustion air rapidly drives out the gases of the fine grains. The coarser grains are then ignited by the flame of the finer grains.

My invention therefore provides the means for reducing the grinding cost of the fuel powder. The fine grinding needs to be carried only so far that in the ground powder just enough quick igniting finest particles are present to bring the combustion air of the cylinder to that temperature which will result in the ignition and burning up of the part of the powder which is in the form of larger grains within the time limit determined by the machine.

In order to surely bring about the ignition of the coarser ground powder grains in the combustion chamber of the engine they should be introduced into the cylinder only after the finer more rapidly igniting powder grains. For this purpose the mixture of coarse and fine particles can be subjected to a separation as it enters the cylinder, for example by sifting or the like. This can be accomplished in the manner shown in Figs. 1, 2, and 4 by arranging in the precombustion chamber 5, or at its outlet end, reflecting surfaces 14 or any other devices for retarding the fuel powder flowing through. By these reflecting surfaces the coarser and heavier grains are thrown back and retarded in their motion, while the finer and lighter grains follow more easily the changes in direction of the conveying air current necessitated by these hindrances and do not strike against the reflecting walls. They therefore suffer no decrease in velocity and pass into the combustion space of the engine sooner than the coarser grains.

By means of my invention every too uncertainly or too slowly igniting or too slowly burning kind of powder (e. g. anthracite, coal of high ash content, coke residues from distillation, de-oiling or bitumen removing operations, moist peat, wood-meal, fallen leaves, animal carcasses, etc.) can be adapted for utilization in internal combustion engines by utilizing these slow igniting materials together with greater or less quantities of lignite powder, low ash coal dust, finest ground coal, powder of naphthalene or other solid hydro-carbons such an anthracene or sugar or any other easily ignitable powder.

In certain cases the slow igniting powder can also be impregnated with substances favoring ignition such as saltpeter, potassium chlorate, phosphorous solution, or with vapors or gases of easily ignitable substances. This may be done either before the fuel is fed into the engine or in the engine itself. In Fig. 1 is shown a supply conduit 15 opening into the precombustion chamber 5 for any desired kind of gaseous or liquid substance such as hydro-carbons, which are forced into the precombustion chamber 5 at the proper time in the cycle by a pump (not shown). This liquid or gaseous substance is finely divided by an atomizer 16 and charges the fuel powder or a part of the same in the precombustion chamber 5 with a vapor or spray which increases its inflammability.

In carrying out the process according to my invention any internal combustion engine of the reciprocating type (e. g. Diesel, semi-Diesel, hot bulb or any other high pressure motor) or any engine working on the turbine principle (e. g. according to the Holzwarth system) may be used. The process can also be used in the type of internal combustion engines not used for the production of power, but primarily for the production of certain chemical products as waste gases.

In the drawing only such internal combustion engines are represented as have a constantly open communication between the precombustion chamber 5 and the working cylinder 1. My invention is of course also applicable to engines having the so-called closed jet, that is, one in which a valve is arranged in the duct leading from the precombustion chamber 5 to the working cylinder which is opened when the charge of the precombustion chamber is blown out into the working cylinder.

Having described my invention, I claim:

1. In a powdered fuel engine, a combustion chamber, means for feeding powdered fuel into said combustion chamber, and means for separately supplying different grades of fuel powder to said feeding means.

2. In a powdered fuel engine of the reciprocating type, a combustion chamber, a precombustion chamber, means of communication between said chambers, a fuel reservoir, means for separately supplying different grades of fuel powder to said reservoir, and means for moving measured quantities of the fuel from said reservoir to said precombustion chamber in time with the engine strokes.

3. In a powdered fuel engine of the reciprocating type, a combustion chamber, a precombustion chamber, means of communication between said chambers, means for separately feeding different grades of powdered fuel to said precombustion chamber in time with the engine strokes, and means for blowing the charges of fuel from said precombustion chamber into said combustion chamber before each work stroke.

4. In a powdered fuel engine of the reciprocating type, a combustion chamber, a precombustion chamber, means of communication between said chambers, a partition dividing said precombustion chamber into two spaces, means for feeding different grades of powdered fuel to said two spaces in time with the engine strokes, and means for blowing the charges of fuel from said spaces into said combustion chamber before each work stroke.

5. In a powdered fuel engine of the reciprocating type, a combustion chamber, a precombustion chamber, a screen dividing said precombustion chamber into two spaces, a duct leading from one of said spaces into said combustion chamber, means for feeding quick igniting powdered fuel into the space in which said duct terminates, means for feeding slow igniting fuel into the other space, said fuel feeding means operating in time with the engine strokes, and means for blowing the fuel in both said spaces through said duct into said combustion chamber before each work stroke, whereby said quick igniting fuel will enter said combustion chamber first.

6. In a powdered fuel engine of the reciprocating type, a combustion chamber, a plurality of precombustion chambers, means of communication between said precombustion chambers and said combustion chamber, means for feeding different grades of fuel powder into said precombustion chambers in time with the engine strokes, and means for blowing the charges of fuel from said precombustion chambers into said combustion chamber before each work stroke.

7. In a powdered fuel engine of the reciprocating type, a combustion chamber, two precombustion chambers, means of communication between said precombustion chambers and said combustion chamber, means for feeding quick igniting fuel powder into one of said precombustion chambers, means for feeding slow igniting fuel powder into the other precombustion chamber, said fuel feeding means operating in time with the engine strokes, and means for blowing the fuel in said precombustion chambers into said combustion chamber before each work stroke in such a manner that the quick burning fuel powder enters said combustion chamber first.

8. In a pulverized fuel engine of the expansible chamber type, means for feeding into said chamber before each work stroke first a priming charge of quick igniting or burning fuel powder and then a working charge of slower igniting or burning fuel powder.

9. In a pulverized fuel engine, a cylinder, a piston adapted to reciprocate therein, means for admitting air to the cylinder, a precombustion chamber, means of communication between said precombustion chamber and said cylinder, means for feeding a mixture of quick igniting and slow igniting fuel powders into said precombustion chamber in time with the engine strokes, means for blowing said fuel powders from said precombustion chamber into said cylinder before each work stroke, and means for retarding the slow igniting fuel powder so that the quick igniting fuel powder enters the cylinder first.

10. In a pulverized fuel engine of the expansible chamber type, means for feeding priming fuel powder and working fuel powder into said chamber in time with the engine strokes, said feeding means being adapted to cause some of said priming fuel powder to enter said chamber before said working fuel powder at each stroke of the engine.

11. The method of operating a pulverized fuel engine of the expansible chamber type, which consists in introducing into the chamber of said engine at each stroke a charge of working fuel powder having slow igniting or burning qualities and a priming charge of quick igniting or burning fuel powder sufficient to cause the complete ignition and combustion of said working charge during one stroke of the engine.

RUD. PAWLIKOWSKI.